Aug. 11, 1931.  L. W. BOND  1,818,786

MASTER CARRIER FOR CURTAIN TRACKS

Filed March 18, 1930

WITNESSES

INVENTOR
Lester W. Bond
BY
ATTORNEYS

Patented Aug. 11, 1931

1,818,786

UNITED STATES PATENT OFFICE

LESTER W. BOND, OF NEW YORK, N. Y., ASSIGNOR TO THE KRODER REUBEL CO., INC., OF NEW YORK, N. Y., A CORPORATION OF NEW YORK

MASTER CARRIER FOR CURTAIN TRACKS

Application filed March 18, 1930. Serial No. 436,879.

This invention relates to carriers for curtain tracks, and particularly to an improved master carrier which is comparatively simple and inexpensive to manufacture, while presenting an extremely strong, efficient structure capable of being quickly and easily clamped to a cord or unclamped therefrom.

The object of the invention is to provide an improved master carrier which may be used for curtains, portières or the like in order to support these articles properly on a track, so that the stretchage and shrinkage of cords can be taken up or provided for simply, and without having to untie knots or disturb the cord arrangement.

Another object of the invention is to provide a master carrier which may be quickly and easily adjusted to any desired place on the cord without removing the cord or disturbing the rigging.

A further object, more specifically, is to provide a master carrier wherein an aperture is provided for a cord and a combined clamping member and eye which act to clamp the cord to the carrier and present a proper connection or support for pins or other fastening means used to secure curtains to carriers.

An additional object is to provide a master carrier which may be provided with a pair of anti-friction rollers adapted to roll in opposite sections of a track or may be made with a single annular groove so as to be used with a different form of track.

In the accompanying drawing,—

Figure 1:
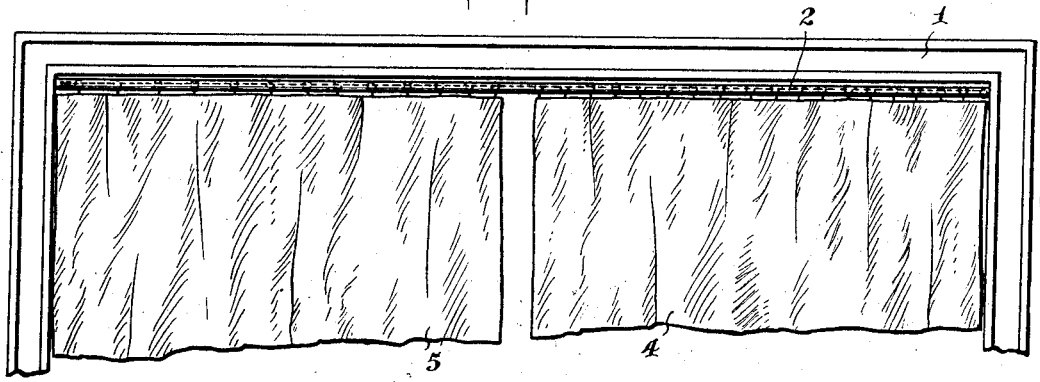
Figure 1 is a fragmentary front view of a door opening provided with curtains, a track and master carriers arranged to support the curtains on the track.
Figure 2:
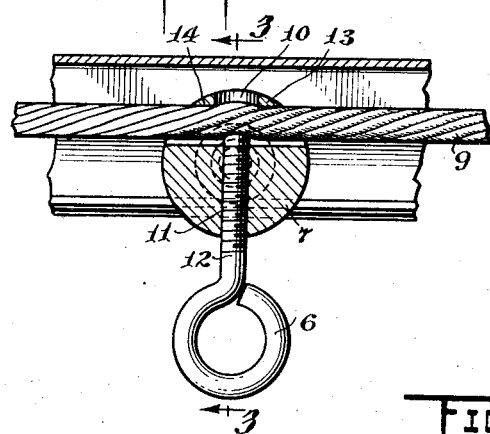
Figure 2 is an enlarged fragmentary sectional view through part of the track shown in Figure 1, a master carrier embodying the invention shown in connection therewith.
Figure 3:
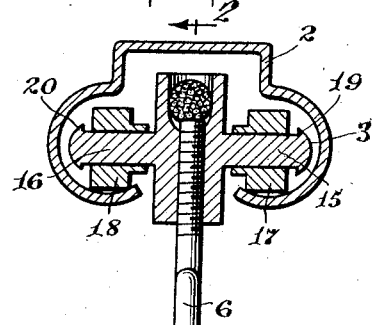
Figure 3 is a sectional view through Figure 2 on the line 3—3.
Figure 4:
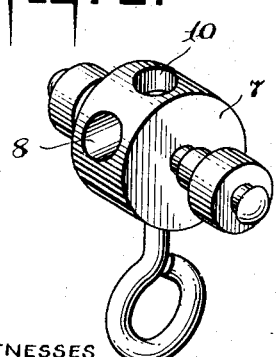
Figure 4 is a perspective view of the master carrier shown in Figure 2.

Referring to the accompanying drawings by numerals, 1 indicates a door opening of any desired kind provided with a track 2 which is shown more in detail in Figure 3. Arranged to be supported by track 2 are a number of master carriers 3. Suitable pins or other fastening means (not shown) are used to connect the curtains 4 and 5 with the eyes 6 of the respective carriers. The tracks shown in the drawings are old and well-known but are illustrated in order to show how the carriers are used, the carriers disclosing the invention. The carrier illustrated in Figures 2 to 4 inclusive is provided with a central body 7 formed with a passageway 8 extending entirely therethrough accomodating the cord or cable 9. A second aperture or passageway 10 is formed in the body 7 and extends at right angles to passageway 8 until it merges therein. A threaded passageway or bore 11 is provided in body 7 in line with the passageway 10 so as to accommodate the screw 12 which preferably is formed integral with the eye 6. Preferably the screw 12 and passageway 11 are smaller than the passageway or opening 10, though they could be made larger, if desired. After the cable or cord 9 has been forced through passageway 8, or rather, after the body 7 has been slidably moved over the cord 9 to a desired point screw 12 is actuated, eye 6 acting as a handle whereby the screw may be properly turned for clamping the cord 9 against the sections 13 and 14, whereby body 7 is rigidly locked in place. By reversing the movement of screw 12 the body 7 may be released and then removed or shifted to a new position. Preferably body 7 has integral arms 15 and 16 which act as stub shafts for the respective rollers 17 and 18. The arms 15 and 16 are upset or turned-over at the ends 19 and 20, whereby the rollers 17 and 18 are held against accidental displacement.

Figure 5:
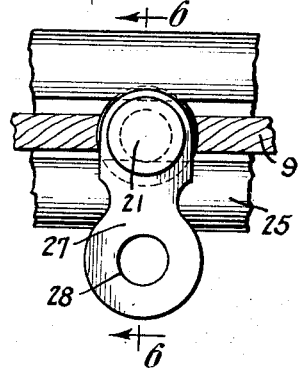
Figure 5 is a side view of a modified form of track to that shown in Figures 1 and 2, together with a modified form of the invention to that illustrated in Figure 4.
Figure 6:
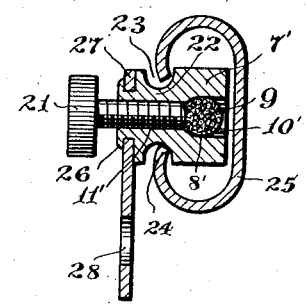
Figure 6 is a sectional view through Figure 5 on the line 6—6.

In Figures 5 and 6 a modified form of the invention is shown wherein the body 7' is provided with passageway 8' and 10', while the threaded passageway 11' is supplied with a thumb screw 21, said screw being adapted to clamp the cord 9 in position. Body 7' is formed with an extension 22 having an annular groove 23 which accommodates a turned-up flange 24 of the track 25. The extension 22 is provided with a turned-over end section 26 which acts to clamp the hanger plate 27 in position. Plate 27 is provided with an aperture 28 so that the lower part will act in the same capacity as eye 6 in the preferred form of the invention. In the form of the invention shown in Figure 6 there are no rollers but the plate 27 acts as a hanger to which the curtains, portières or the like may be connected.

What I claim is:—

1. A master carrier of the character described, comprising a body, a cord-receiving passageway extending therethrough, a passageway intersecting the first mentioned passageway, said last mentioned passageway having an enlarged section and a reduced threaded section, a curtain-supporting screw member fitting into said threaded passageway and positioned to pinch the cord in said cord-receiving passageway and force part thereof into the enlarged passageway, and means extending from said body adapted to coact with a track for supporting the body while connected with a cord.

2. A master carrier, including a substantially disk-shaped body having a cord-receiving passageway, a screw member for clamping said cord in said passageway, said screw member being formed with its free end as a curtain support, means integral with said body extending from the center thereof, and rollers mounted on said means adapted to engage a track, whereby the body is supported.

3. A master carrier for curtain tracks having longitudinal slots, comprising a disk-shaped body having centrally positioned integral laterally-projecting arms, a roller mounted on each of said arms, said body in its upper part being provided with a passageway and means carried by said body for clamping a cord to said body in said passageway, said body being of a diameter to project sufficiently through said slot to be guided by side edges thereof.

4. A master carrier for tracks, comprising a disk-shaped body having a pair of arms extending therefrom, anti-friction means arranged on each arm, said body having a cord receiving passageway extending therethrough on one side of the axis thereof and adapted to receive a cord and a threaded passageway extending at right angles to said cord receiving passageway, and a screw member fitting into said threaded passageway acting at one end to clamp said cord in position and at the other end as means for supporting a curtain.

5. A master carrier for curtain tracks, comprising a substantially disk-shaped body having a cord passageway and a passageway intercepting said cord passageway, said last-mentioned passageway being threaded for part of its length, a screw member fitting into said threaded passageway for clamping a cord in the cord passageway and forcing part of the cord into the unthreaded part of the second-mentioned passageway, the free end of said member also acting as a curtain support, a pair of arms extending axially from the center of said body and track engaging anti-friction rollers mounted on said arms.

6. A master carrier for tracks including a body having a cord passageway and a track engaging extension, an apertured hanger rigidly clamped to said extension and a clamping screw extending through said extension to said cord passageway, whereby the screw may lock the carrier to a cord.

Signed at New York city, in the county of New York and State of New York, this 5th day of March, 1930.

LESTER W. BOND.